US009220121B2

(12) United States Patent
Yilmaz

(10) Patent No.: US 9,220,121 B2
(45) Date of Patent: Dec. 22, 2015

(54) DEVICE TO DEVICE INTERFERENCE TRIGGERED HANDOVER

(71) Applicant: NOKIA CORPORATION, Espoo (FI)

(72) Inventor: Osman Yilmaz, Helsinki (FI)

(73) Assignee: NOKIA TECHNOLOGIES OY, Espoo (FI)

(*) Notice: Subject to any disclaimer, the term of this patent is extended or adjusted under 35 U.S.C. 154(b) by 46 days.

(21) Appl. No.: 14/084,247

(22) Filed: Nov. 19, 2013

(65) Prior Publication Data

US 2015/0141000 A1 May 21, 2015

(51) Int. Cl.
H04W 36/00 (2009.01)
H04W 76/02 (2009.01)
H04W 36/30 (2009.01)
H04W 88/06 (2009.01)

(52) U.S. Cl.
CPC ........ *H04W 76/023* (2013.01); *H04W 36/0094* (2013.01); *H04W 36/30* (2013.01); *H04W 88/06* (2013.01)

(58) Field of Classification Search
CPC ............ H04W 36/30; H04W 36/0094; H04W 76/023; H04W 88/06
USPC ........................ 455/436, 439, 444, 445, 426.1
See application file for complete search history.

(56) References Cited

U.S. PATENT DOCUMENTS

| 2012/0093098 A1* | 4/2012 | Charbit | H04W 72/04 370/329 |
| 2012/0322484 A1* | 12/2012 | Yu | H04W 4/08 455/509 |
| 2013/0102314 A1* | 4/2013 | Koskela | H04W 36/0072 455/436 |
| 2014/0051357 A1* | 2/2014 | Steer et al. | 455/41.2 |
| 2014/0160946 A1* | 6/2014 | Bodas | H04W 52/5242 370/252 |
| 2014/0243040 A1* | 8/2014 | Bienas et al. | 455/552.1 |

OTHER PUBLICATIONS

Qualcomm Incorporated, "Study on LTE Device-to-Device Proximity Services", 3GPP TSG RAN Meeting #58, RP-122009, 6 pages.

* cited by examiner

*Primary Examiner* — Khai M Nguyen
(74) *Attorney, Agent, or Firm* — Squire Patton Boggs (US) LLP

(57) ABSTRACT

Various communication systems may benefit from properly triggered handovers. For example, certain communication systems may benefit from device-to-device interference triggered handovers. A method may include identifying, at a device, at least one strong device to device communication. The method may also include reporting, or initiating the reporting, the at least one strong device to device communication to a controlling node, wherein the controlling node is configured to control the device.

10 Claims, 5 Drawing Sheets

DEVICE TO DEVICE INTERFERENCE TRIGGERED HANDOVER

BACKGROUND

1. Field

Various communication systems may benefit from properly triggered handovers. For example, certain communication systems may benefit from device-to-device interference triggered handovers.

2. Description of the Related Art

Proximity services (ProSe) for device-to-device (D2D) communications includes a number of different aspects to be addressed. Amongst those aspects are the co-existence of cellular D2D communications and how to handle the interference among D2D pairs. Hence, D2D radio resource and mobility management may be of value.

Mobility and interference management for D2D communications may help to permit efficient operation of simultaneously communicating D2D pairs or clusters in the same area. To optimize resource re-use and to avoid intolerable interference, D2D pairs or clusters may measure D2D beacons and report to the coordinating base station/network, or alternatively report to a master UE, such as in an out-of-coverage scenario.

SUMMARY

According to certain embodiments, a method includes identifying, at a device, at least one strong device to device communication. The method also includes reporting, or initiating the reporting, the at least one strong device to device communication to a controlling node, wherein the controlling node is configured to control the device.

In certain embodiments, a method includes identifying a strong device to device communication based on a report received from a device. The method also includes determining whether to hand over at least one device based on whether the at least one device is part of strong device to device communication.

An apparatus, according to certain embodiments, may include at least one processor and at least one memory including computer program code. The at least one memory and the computer program code may be configured to, with the at least one processor, cause the apparatus at least to identify, at a device, at least one strong device to device communication. The at least one memory and the computer program code may also be configured to, with the at least one processor, cause the apparatus at least to report, or initiate the report of, the at least one strong device to device communication to a controlling node, wherein the controlling node is configured to control the device.

An apparatus, in certain embodiments, may include at least one processor and at least one memory including computer program code. The at least one memory and the computer program code may be configured to, with the at least one processor, cause the apparatus at least to identify a strong device to device communication based on a report received from a device. The at least one memory and the computer program code may also be configured to, with the at least one processor, cause the apparatus at least to determine whether to hand over at least one device based on whether the at least one device is part of strong device to device communication.

According to certain embodiments, an apparatus may include means for identifying, at a device, at least one strong device to device communication. The apparatus may also include means for reporting, or initiating the reporting, the at least one strong device to device communication to a controlling node, wherein the controlling node is configured to control the device.

In certain embodiments, an apparatus may include means for identifying a strong device to device communication based on a report received from a device. The apparatus may also include means for determining whether to hand over at least one device based on whether the at least one device is part of strong device to device communication.

A non-transitory computer-readable medium may, according to certain embodiments, be encoded with instructions that, when executed in hardware, perform a process. The process may include identifying, at a device, at least one strong device to device communication. The process may also include reporting, or initiating the reporting, the at least one strong device to device communication to a controlling node, wherein the controlling node is configured to control the device.

A non-transitory computer-readable medium may, in certain embodiments, be encoded with instructions that, when executed in hardware, perform a process. The process may include identifying a strong device to device communication based on a report received from a device. The process may also include determining whether to hand over at least one device based on whether the at least one device is part of strong device to device communication.

According to certain embodiments, a computer program product may encode instructions for performing a process. The process may include identifying, at a device, at least one strong device to device communication. The process may also include reporting, or initiating the reporting, the at least one strong device to device communication to a controlling node, wherein the controlling node is configured to control the device.

In certain embodiments, a computer program product may encode instructions for performing a process. The process may include identifying a strong device to device communication based on a report received from a device. The process may also include determining whether to hand over at least one device based on whether the at least one device is part of strong device to device communication.

BRIEF DESCRIPTION OF THE DRAWINGS

For proper understanding of the invention, reference should be made to the accompanying drawings, wherein.

DETAILED DESCRIPTION

D2D user equipment devices (UEs) may sometimes be controlled by a network. However, at the cell-edge or handover region, the D2D pairs/clusters may be controlled by different base stations/nodes. This may cause interference between D2D pairs/clusters. One option is for the controlling nodes to coordinate resource re-use of D2D pairs/clusters. This may rely on fast information exchange between the controlling nodes, which may be challenging due to backhaul limitations and may cause additional signaling overhead.

Figure 1:
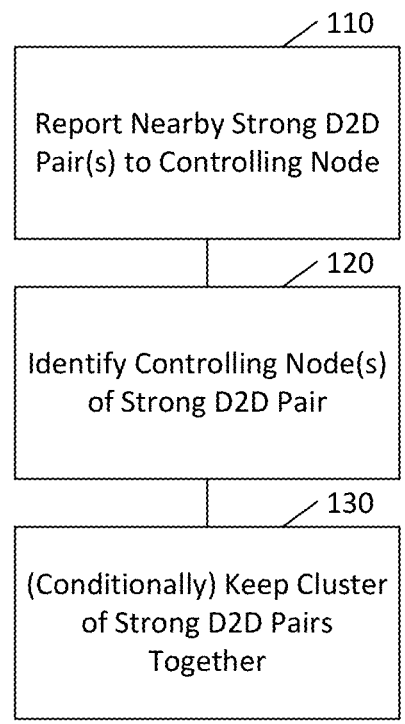
FIG. 1 illustrates a method according to certain embodiments.

Certain embodiments instead transfer D2D-interference vulnerable D2D pairs to the optimal D2D-controlling node based on the received energy from the neighboring D2D pairs. FIG. 1 illustrates a method according to certain embodiments. The method of FIG. 1 may provide for such transfer of D2D-interference vulnerable D2D pairs.

As shown in FIG. 1, the method may include, at 110, a D2D pair reporting nearby strong D2D pair(s) to the controlling node. Here, a D2D pair may be classified as a strong D2D pair if the resource-reuse with this pair would not be beneficial for the reporting D2D pair due to inter-D2D pair interference. A threshold level of potential interference may be used to determine whether the D2D pair is a strong D2D pair. A strong D2D pair may be a D2D pair that has over −90 dBm reference signal received power (RSRP). In another example, a strong D2D pair may be relatively stronger than the D2D pair that identified the strong D2D pair by, for example, 6 dB. The controlling node may be a base station, such as an evolved Node B (eNB) or other controlling network element.

At 120, at least one controlling node of the reporting D2D pair may identify the controlling node(s) of strong D2D pair(s). There are a variety of ways that this identification may be made. For example, the information about the controlling node(s) of strong D2D pair(s) may be based on, for example, controlling node specific identification embedded/coded in the strong D2D pair's signal/beacon. This information may be decoded by either the reporting D2D pair or by the controlling node.

At 130, the cluster of strong D2D pairs together may be kept together. This may be accomplished in a variety of ways, such as by issuing or delaying the D2D-control handover of the reporting D2D to another node, if feasible. This keeping together of the strong D2D pairs may be contingent on the reporting D2D pair itself not being reported as a strong D2D pair by another D2D pair under the same controlling node.

Thus, in certain embodiments the control of a D2D pair may not always be handed over based on the handover (HO) hysteresis and offset conditions, for example in terms of the node specific downlink reference symbol. Instead, the D2D pair may also be handed over to a node based on where the received D2D interference may be intolerable. This may benefit the interference management between D2D pairs under the control of different nodes.

To decode the controlling cell information of a strong D2D pair, the D2D pair beacon or signal could be designed to include the controlling node information, such as the information of the D2D-controlling cell. The information could, for example, be provided as a part of the D2D pair identifier.

This discussion has explained embodiments in terms of a "D2D pair," but the same may be applied to a unidirectional D2D link or a D2D multicast in, for example, different D2D contexts. Thus, various embodiments are possible.

In certain embodiments, D2D resource allocation and interference management may be managed by a controlling node. The controlling node may be, for example, at least one of a base station or a master user equipment (UE) or a controlling agent.

Figure 2:
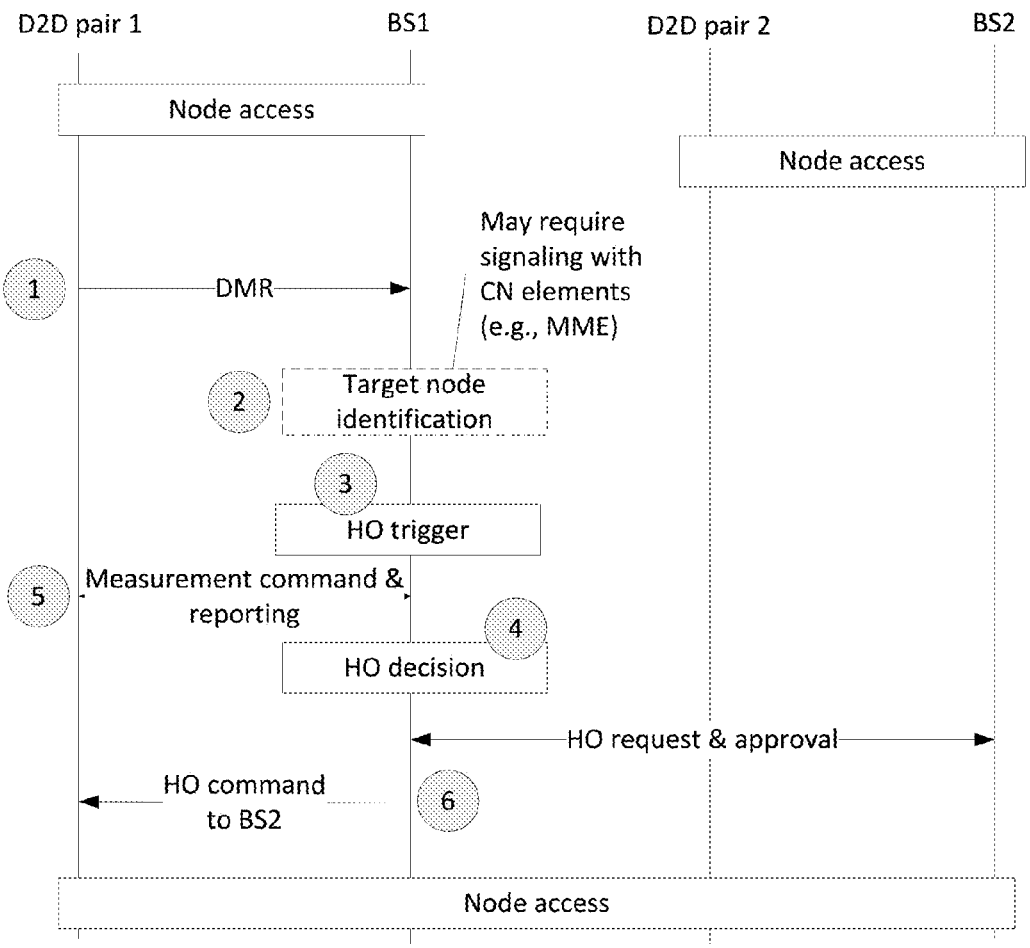
FIG. 2 illustrates a signaling flow according to certain embodiments.

FIG. 2 illustrates a signaling flow according to certain embodiments. FIG. 2 more particularly illustrates an exemplary signaling flow for base station controlled mobility and interference/resource management. Interference conditions may change due to the mobility of the D2D pair(s).

At 1, D2D pair 1 may send a D2D measurement report (DMR) to the controlling base station. The DMR may include measurements for received or scattered energy from other D2D pairs, such as D2D pair 2. The DMR may also include identification information of D2D pair and/or the controlling cell ID.

At 2, if the controlling base station information is not decodable by D2D pair 1 or BS1, BS1 may identify the controlling cell of D2D pair 2 by, for example, inquiring of the network with the available identification information related to D2D pair 2 and/or the controlling cell of D2D pair 2.

At 3, depending on the DMRs sent by D2D pair 1 and other D2D pairs under the control of BS1, the controlling base station (BS 1) may trigger a D2D-control handover for D2D pair 1.

At 4, the D2D-control handover decision for D2D pair 1 may also depend on the other DMRs reported by the neighboring D2D pairs under the control of BS1. Thus, the decision may avoid causing a similar problem to the neighboring D2D pairs in the source cell after issuing the D2D-control handover of D2D pair 1.

At 5, D2D pair 1 UE(s) may perform measurements for BS2 if needed. Then, at 6, the triggered handover may be executed to BS2, if allowed and feasible.

Cellular communication may be minimally impacted by certain embodiments, since the decisions may be made at the cell-edge where the UE is not necessarily connected to the best cell. In addition, the handover triggering/delaying decision may be taken only if the UE does not have an ongoing cellular service; or if the D2D control and cellular control may stay in different cells, for example, in a form of dual connectivity; or if the impact of the handover is negligible to the on-going cellular service(s) or a high-priority service.

In FIG. 2, dashed lines denote optional signaling. However, the steps may also be performed in different orders and even those portions with solid lines may be substituted or omitted, in certain embodiments.

If the intention is to manage the handover of D2D UEs only if there is the actual presence of interference, not only when strong D2D pairs are around, the D2D UE may identify the strong interference in the data or control channel. If D2D communications has certain dedicated resources, then the problem may plainly be due to a neighboring D2D pair. If there is no dedicated resource for D2D, the controlling cell of the interfered D2D pair could identify the root-source of the interference by exchanging information with the controlling cell of the potential D2D interferer.

On the other hand, certain embodiments address the interference problem by solving it before it occurs. Hence, certain embodiments identify the strong D2D pairs in advance and put them under the same controlling cell. Then, even if there is a strong interference presence, it is not because of a strongly interfering D2D pair, for example, due to an uplink transmission).

Certain embodiments may have various benefits or advantages. For example, certain embodiments may provide less D2D interference, more efficient utilization of resources, and less coordination overhead between D2D-controlling nodes. Certain embodiments may be particularly beneficial in systems where nodes tightly control D2D operation. However, certain embodiments may also be of use in systems were D2D operations are more autonomous, with relatively minimal control provided by the base station or master user equipment.

Figure 3:
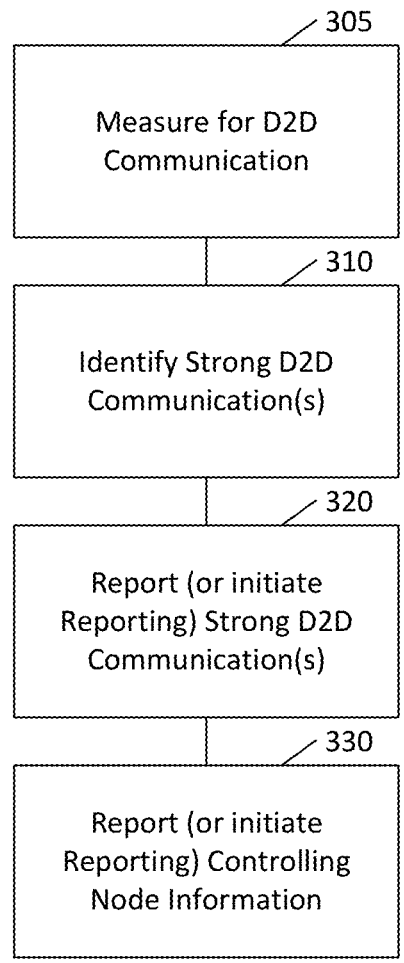
FIG. 3 illustrates a method according to certain embodiments.

FIG. 3 illustrates a method according to certain embodiments. The method of FIG. 3 may be performed by, for example, a user equipment device, such as a device configured for device to device communication.

As shown in FIG. 3, the method may include, at 310, identifying, at a device, at least one strong device to device communication. The identification may be based on, for example, measuring at 305. The method may also include, at 320, reporting, or initiating the reporting, the at least one strong device to device communication to a controlling node, wherein the controlling node is configured to control the device.

The at least one strong device to device communication may be the communication associated with at least one device to device pair, at least one device to device unicast, or at least one device to device multicast. Thus, for example, identifying the at least one strong device to device communication may involve identifying at least one strong device to device pair in either direction or both directions of the communication link between the devices.

The method may further include, at 330, reporting, to the controlling node, an identification of at least one controlling node corresponding to the at least one strong device to device communication. The identification may be or include at least one of identification information of a device to device pair or a controlling cell identifier.

Figure 4:
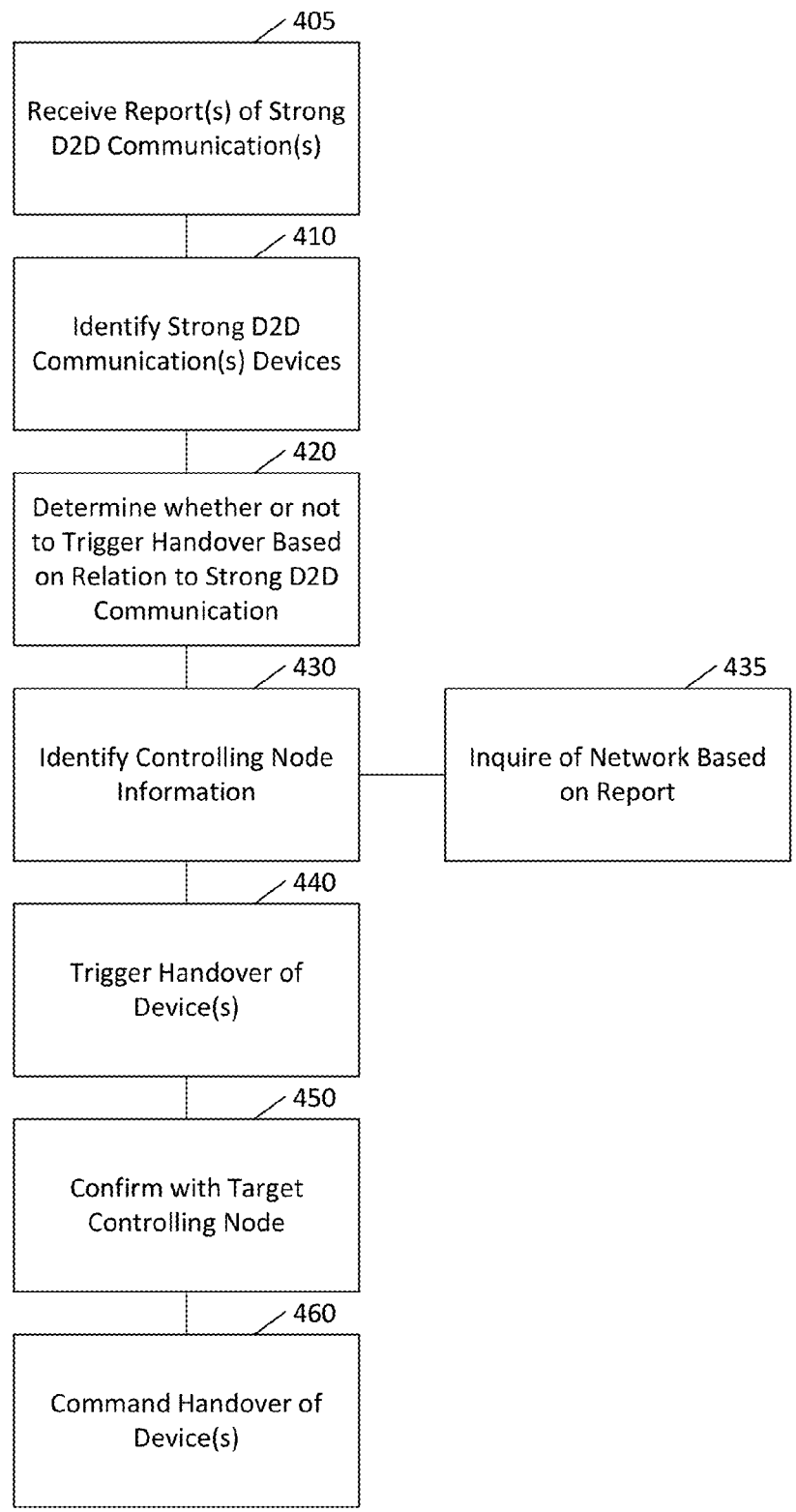
FIG. 4 illustrates another method according to certain embodiments.

FIG. 4 illustrates another method according to certain embodiments. The method of FIG. 4 may be performed by a controlling node such as, for example, a base station or master user equipment or a controlling agent.

As shown in FIG. 4, a method may include, at 410, identifying a strong device to device communication based on a report received from a device at 405. The method may also include, at 420, determining whether to hand over at least one device based on whether the at least one device is part of strong device to device communication.

For example, the handover determination may be regarding at least one of the D2D devices with the strong D2D communication being handed over to the controlling node of the device that identified the strong D2D communication. Alternatively, or in addition, the handover determination may be regarding handover of the device (and paired devices) that identified the strong D2D pair to the controlling node of the strong D2D pair. In other words, both cases of handover are broadly included within the determining whether to hand over at least one device based on whether the at least one device is part of strong device to device communication.

The determining may be configured to keep strong device to device communicators under control of a same controlling node. For example, the determination may take into account the number of strong device-to-device pairs under control of the controlling node compared to the number under control of a neighboring controlling node.

The method may further include, at 430, identifying a controlling node associated with the strong device to device communication. The identifying the controlling node may include, at 435, inquiring of a network based on information included in the report.

The method may additionally include, at 440, triggering handover of the at least one device, based on the determining, when handing over the device places more strong device to device communications under a single controlling node.

The method may also include, at 450, confirming with a target controlling node that handing over the device places more strong device to device communications under the single controlling node, prior to, at 460, commanding the at least one device to hand over.

Figure 5:
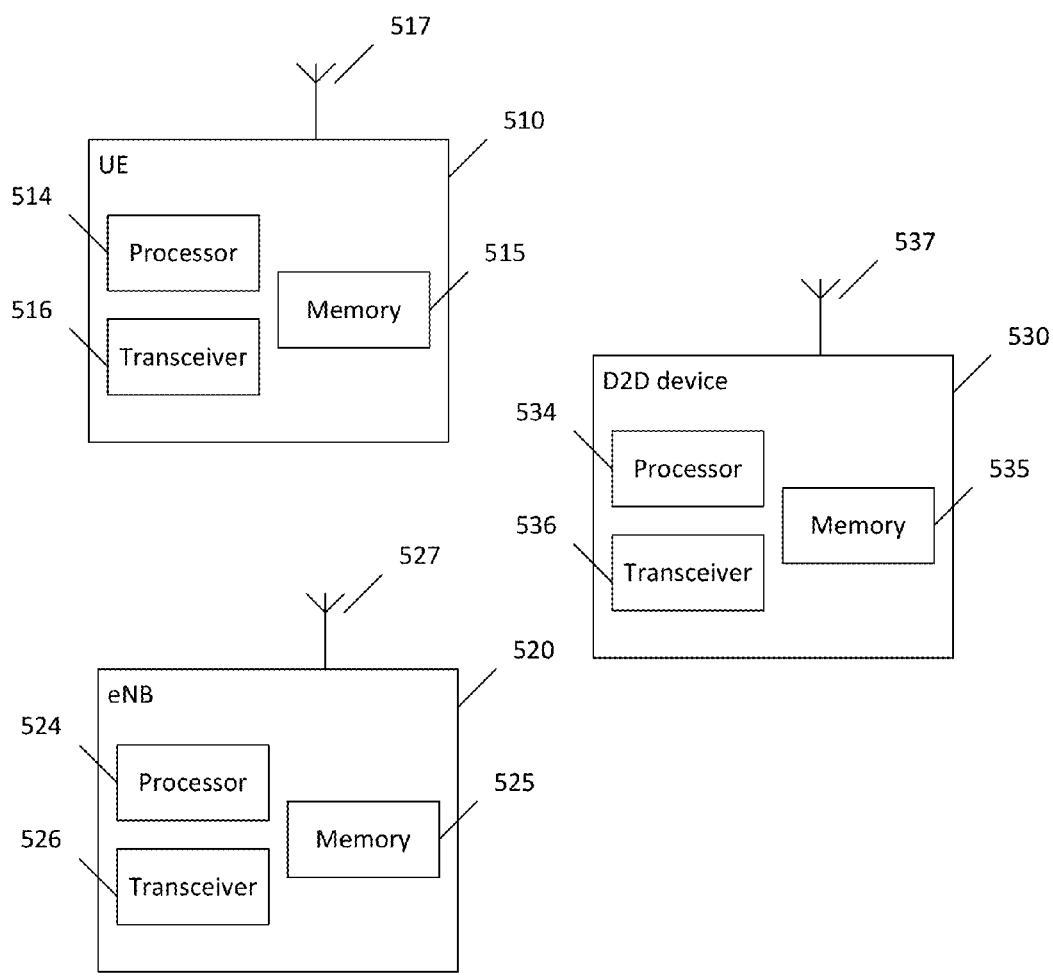
FIG. 5 illustrates a system according to certain embodiments.

FIG. 5 illustrates a system according to certain embodiments of the invention. In one embodiment, a system may include multiple devices, such as, for example, at least one UE 510, at least one eNB 520 or other base station or access point, and at least one D2D device 530. In certain systems, UE 510, eNB 520, D2D device 530, and a plurality of other user equipment and D2D devices may be present. Other configurations are also possible, including those with multiple base stations, such as eNBs. The UE 510 may be equipped for both cellular and D2D communication. In other word, the UE 510 may operate in a cellular mode for cellular communication, and in a D2D mode for D2D communication.

Each of these devices may include at least one processor, respectively indicated as 514, 524, and 534. At least one memory may be provided in each device, as indicated at 515, 525, and 535, respectively. The memory may include computer program instructions or computer code contained therein. The processors 514, 524, and 534 and memories 515, 525, and 535, or a subset thereof, may be configured to provide means corresponding to the various blocks of FIGS. 1, 3, and 4. Although not shown, the devices may also include positioning hardware, such as global positioning system (GPS) or micro electrical mechanical system (MEMS) hardware, which may be used to determine a location of the device. Other sensors are also permitted and may be included to determine location, elevation, orientation, and so forth, such as barometers, compasses, and the like.

As shown in FIG. 5, transceivers 516, 526, and 536 may be provided, and each device may also include at least one antenna, respectively illustrated as 517, 527, and 537. The device may have many antennas, such as an array of antennas configured for multiple input multiple output (MIMO) communications, or multiple antennas for multiple radio access technologies. Other configurations of these devices, for example, may be provided. For example, eNB 520 may additionally be configured for wired communication, and in such a case antenna 527 would also illustrate any form of communication hardware, without requiring a conventional antenna.

Transceivers 516, 526, and 536 may each, independently, be a transmitter, a receiver, or both a transmitter and a receiver, or a unit or device that is configured both for transmission and reception.

Processors 514, 524, and 534 may be embodied by any computational or data processing device, such as a central processing unit (CPU), application specific integrated circuit (ASIC), or comparable device. The processors may be implemented as a single controller, or a plurality of controllers or processors.

Memories 515, 525, and 535 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate from the one or more processors. Furthermore, the computer program instructions stored in the memory and which may be processed by the processors may be any suitable form of computer program code, for example, a compiled or interpreted computer program written in any suitable programming language.

The memory and the computer program instructions may be configured, with the processor for the particular device, to cause a hardware apparatus such as UE 510, eNB 520, and D2D device 530, to perform any of the processes described above (see, for example, FIGS. 1-4). Therefore, in certain embodiments, a non-transitory computer-readable medium may be encoded with computer instructions that, when executed in hardware, perform a process such as one of the processes described herein. Alternatively, certain embodiments may be performed entirely in hardware.

Furthermore, although FIG. 5 illustrates a system including a UE, eNB, and D2D device, embodiments of the invention may be applicable to other configurations, and configurations involving additional elements.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

GLOSSARY

ASIC Application Specific Integrated Circuit
CN Core Network
CPU Central Processing Unit
D2D Device to Device Communications
DMR D2D Measurement Report
eNB Evolved Node B
GPS Global Positioning System
HDD Hard Disk Drive
MEMS Micro Electrical Mechanical System
MIMO Multiple Input Multiple Output
MME Mobility Management Entity
ProSe Proximity Services
RAM Random Access Memory
RAN Radio Access Network
ROM Read Only Memory
RSRP Reference Signal Received Power
UE User Equipment

I claim:

1. A method comprising:
   identifying a strong device to device communication based on a report received from a device;
   determining whether to hand over at least one device based on whether the at least one device is part of strong device to device communication; and
   triggering handover of the at least one device, based on the determining, when handing over the device places more strong device to device communications under a single controlling node.

2. The method of claim 1, wherein the determining is configured to keep strong device to device communicators under control of a same controlling node.

3. The method of claim 1, further comprising:
   identifying a controlling node associated with the strong device to device communication.

4. The method of claim 3, wherein the identifying the controlling node comprises inquiring of a network based on information included in the report.

5. The method of claim 1, further comprising:
   confirming with a target controlling node that handing over the device places more strong device to device communications under the single controlling node, prior to commanding the at least one device to hand over.

6. An apparatus, comprising:
   at least one processor; and
   at least one memory including computer program code,
   wherein the at least one memory and the computer program code are configured to, with the at least one processor, cause the apparatus at least to
   identify a strong device to device communication based on a report received from a device;
   determine whether to hand over at least one device based on whether the at least one device is part of strong device to device communication; and
   trigger handover of the at least one device, based on the determining, when handing over the device places more strong device to device communications under a single controlling node.

7. The apparatus of claim 6, wherein the apparatus is configured to keep strong device to device communicators under control of a same controlling node.

8. The apparatus of claim 6, wherein the at least one memory and the computer program code are configured to, with the at least one processor, cause the apparatus at least to identify a controlling node associated with the strong device to device communication.

9. The apparatus of claim 8, wherein the at least one memory and the computer program code are configured to, with the at least one processor, cause the apparatus at least to identify the control by inquiring of a network based on information included in the report.

10. The apparatus of claim 6, wherein the at least one memory and the computer program code are configured to, with the at least one processor, cause the apparatus at least to confirm with a target controlling node that handing over the device places more strong device to device communications under the single controlling node, prior to commanding the at least one device to hand over.

* * * * *